(12) United States Patent
Mizutani

(10) Patent No.: US 11,272,068 B2
(45) Date of Patent: Mar. 8, 2022

(54) POST-PROCESSING APPARATUS AND CONTROL METHOD

(71) Applicant: TOSHIBA TEC KABUSHIKI KAISHA, Tokyo (JP)

(72) Inventor: Kikuo Mizutani, Izu Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 57 days.

(21) Appl. No.: 16/814,732

(22) Filed: Mar. 10, 2020

(65) Prior Publication Data
US 2021/0289093 A1  Sep. 16, 2021

(51) Int. Cl.
*G06F 3/12* (2006.01)
*H04N 1/00* (2006.01)

(52) U.S. Cl.
CPC ..... *H04N 1/00697* (2013.01); *H04N 1/00037* (2013.01); *H04N 1/00639* (2013.01); *H04N 1/00755* (2013.01); *H04N 1/00771* (2013.01)

(58) Field of Classification Search
CPC ........... H04N 1/00697; H04N 1/00037; H04N 1/00771; H04N 1/00639; H04N 1/00755
See application file for complete search history.

(56) References Cited

U.S. PATENT DOCUMENTS

| 10,901,092 | B1 * | 1/2021 | Kantor | G01S 7/4815 |
| 2008/0265484 | A1 * | 10/2008 | Fukasawa | B42C 1/125 270/58.12 |
| 2009/0261521 | A1 * | 10/2009 | Okamoto | B65H 37/04 270/37 |
| 2014/0103604 | A1 * | 4/2014 | Saito | B65H 31/34 271/303 |
| 2017/0153592 | A1 * | 6/2017 | Hashizume | G03G 15/6582 |
| 2020/0186659 | A1 * | 6/2020 | Oshiro | B65H 31/02 |

OTHER PUBLICATIONS

U.S. Appl. No. 16/283,957, filed Feb. 25, 2019, Yuichi Saito.
U.S. Appl. No. 16/507,070, filed Jul. 10, 2019, Toshiaki Oshiro.
U.S. Appl. No. 16/513,775, filed Jul. 17, 2019, Mikio Yamamoto.
U.S. Appl. No. 16/766,426, filed Jan. 29, 2020, Shoichi Dobashi.

* cited by examiner

*Primary Examiner* — Huo Long Chen
(74) *Attorney, Agent, or Firm* — Foley & Lardner LLP

(57) ABSTRACT

A post-processing apparatus is connected to an image forming apparatus that forms an image on a sheet. The post-processing apparatus includes a post-processor, a sensor, and a controller. The post-processor performs post-processing on the sheet. The sensor is provided in a space where the post-processor operates and provides an output based on a presence of a foreign substance in the space. The controller acquires a first output value from the sensor prior to the image forming apparatus forming the image on the sheet, acquires a second output value from the sensor after the image forming apparatus forms the image on the sheet and before the post-processor performs the post-processing on the sheet, and determines whether or not the foreign substance is present in the space based on the first output value and the second output value.

17 Claims, 4 Drawing Sheets

POST-PROCESSING APPARATUS AND CONTROL METHOD

FIELD

Embodiments described herein relate generally to a post-processing apparatus and a control method.

BACKGROUND

In the related art, there is an image forming apparatus that performs post-processing such as stapling after forming an image on a sheet. Such an image forming apparatus is provided with a space for executing the post-processing. Since the sheet is discharged after executing the post-processing, the space for executing the post-processing is connected to the outside. Therefore, when a foreign substance intrudes into the space from the outside, there is a possibility that the post-processing apparatus is broken.

DETAILED DESCRIPTION

In order to prevent damage associated with intrusion of a foreign substance into a space for executing a post-processing operation, a technology in which a sensor including a light emitting unit and a light receiving unit for detecting the foreign substance in the space is provided. In such a technology, when the foreign substance does not exist in the space, light emitted from the light emitting unit directly reaches the light receiving unit such that a large amount of light is received by the light receiving unit. On the other hand, when the foreign substance exists in the space, most of the light emitted from the light emitting unit is blocked by the foreign substance. Therefore, the light receiving unit cannot receive much light. The presence of the foreign substance is detected based upon a change in a light receiving amount in the above-described light receiving unit. However, there is a case in which the foreign substance cannot be detected with high accuracy due to disturbance caused by reflected light by a member in the apparatus.

In general, according to one embodiment, a post-processing apparatus is connected to an image forming apparatus that forms an image on a sheet. The post-processing apparatus includes a processing unit, a sensor, and a control unit. The processing unit performs post-processing on the sheet. The sensor is provided in a space where the processing unit operates and detects the presence of a foreign substance. The control unit detects the presence of the foreign substance immediately before executing the post-processing based upon a first output value which is a value outputted from the sensor before processing in the image forming apparatus and a second output value which is a value outputted from the sensor after the processing in the image forming apparatus and before the execution of the post-processing.

Figure 1:
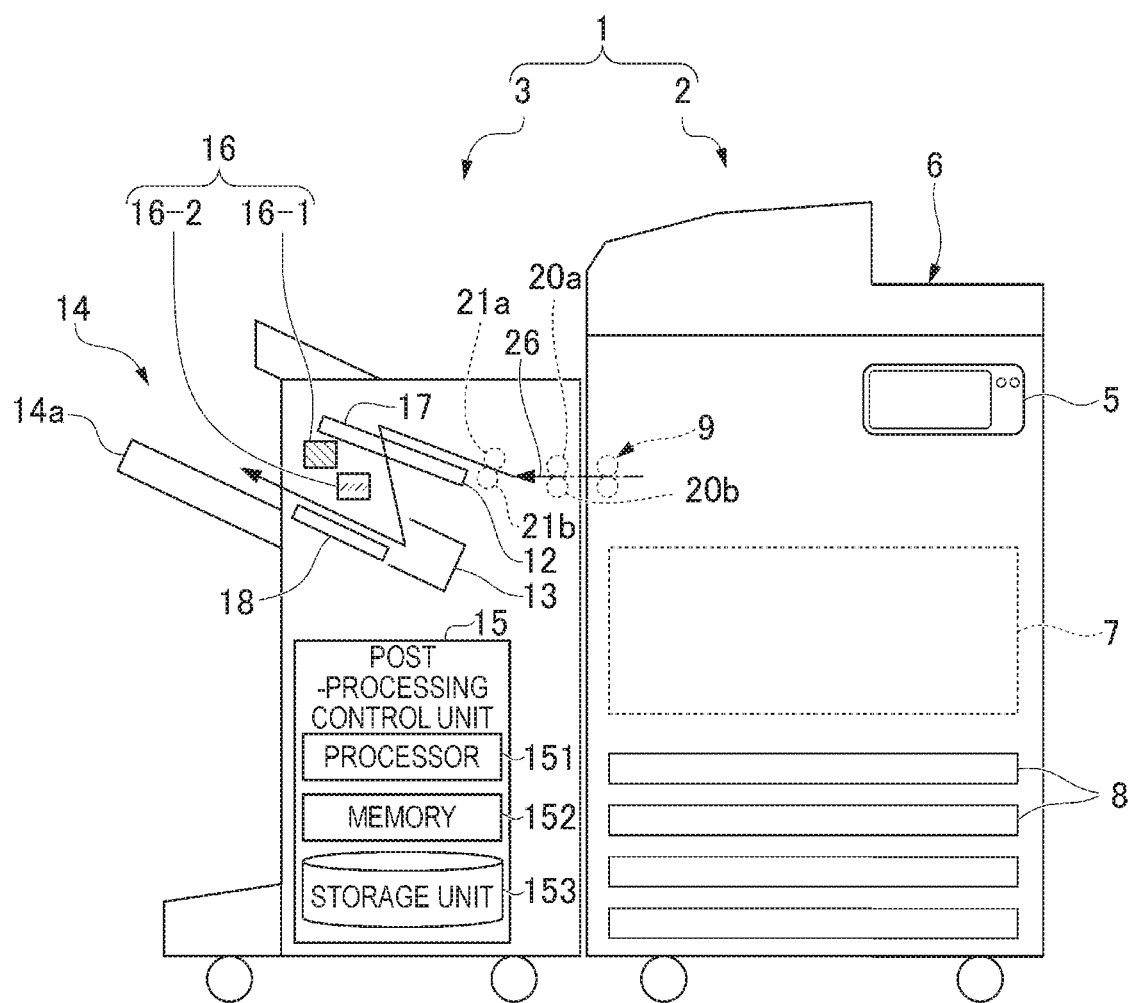
FIG. 1 is a schematic diagram illustrating an example of a hardware configuration of an image forming system according to an embodiment.

Hereinafter, a post-processing apparatus and a control method according to an embodiment will be described with reference to the drawings. FIG. 1 is a schematic diagram illustrating an example of a hardware configuration of an image forming system 1 according to the embodiment.

The image forming system 1 includes an image forming apparatus 2 and a post-processing apparatus 3. The image forming apparatus 2 forms an image on a sheet-shaped recording medium such as paper (hereinafter, referred to as a "sheet"). The post-processing apparatus 3 executes post-processing on the sheet conveyed from the image forming apparatus 2. The post-processing may be any type of process executed after image formation by the image forming apparatus 2. The post-processing may include, for example, stapling (i.e., the process of stapling). The post-processing may be, for example, punching (i.e., the process of punching a hole in the sheet). Hereinafter, in order to simplify the description, the post-processing is assumed to be the stapling. Hereinafter, a bundle of sheets in which a plurality of sheets are stacked is referred to as a sheet bundle.

The image forming apparatus 2 includes a processor, a memory, and an auxiliary storage apparatus connected by a bus, and executes a program. The image forming apparatus 2 functions as an apparatus including a control panel (e.g., an operation unit, a user interface, etc.) 5, a scanner 6, a printer unit 7, a sheet feeding unit 8, and a sheet discharging unit 9 by executing the program.

The control panel 5 includes an input apparatus such as various keys or a touch panel for receiving an operation of a user. The control panel 5 receives an input regarding a type of the post-processing performed on the sheet.

The scanner 6 includes a reading unit that reads image information of an object to be copied. The scanner 6 sends the read image information to the printer unit 7. The printer unit 7 forms a toner image on the sheet by depositing a developer, such as toner, onto the sheet based upon the image information transmitted from the scanner 6 or an external device. The printer unit 7 fixes the toner image on the sheet by applying heat and pressure to the toner image transferred to the sheet.

The sheet feeding unit 8 feeds the sheets one by one to the printer unit 7 in accordance with the timing when the printer unit 7 forms the toner images on the sheets. The sheet discharging unit 9 conveys the sheet on which the image is formed by the printer unit 7 to the post-processing apparatus 3.

Next, the post-processing apparatus 3 will be described. As illustrated in FIG. 1, the post-processing apparatus 3 is installed by being connected to the image forming apparatus 2. The post-processing apparatus 3 executes the post-processing designated by the user on the sheet conveyed from the image forming apparatus 2. The post-processing apparatus 3 includes a standby unit 12, a processing unit 13, a discharge unit 14, and a post-processing control unit 15.

The standby unit 12 temporarily buffers the sheet conveyed from the image forming apparatus 2. The standby unit 12 may be configured to include, for example, a standby tray 17. While the post-processing is performed on the preceding sheet by the processing unit 13, the standby unit 12 causes the subsequent sheet to wait in the standby tray 17 (e.g., the standby tray 17 holds the subsequent sheet while post-processing is performed on the preceding sheet). When the post-processing performed on the preceding sheet is completed and the preceding sheet is discharged, the standby unit 12 moves the subsequent sheet from the standby tray 17 to a processing tray 18.

The processing unit 13 (i.e., a post-processor) executes the post-processing (i.e., a post-processing operation) on the sheet located on the processing tray 18. The processing unit 13 executes, for example, the post-processing (e.g., stapling) on the sheet bundle. The processing unit 13 discharges the sheet bundle on which the post-processing is performed to the discharge unit 14.

The discharge unit 14 includes a sheet discharging tray 14*a*. The sheet or the sheet bundle is discharged from the standby unit 12 or the processing unit 13 to the sheet discharging tray 14*a*.

The post-processing control unit 15 controls an operation of the post-processing apparatus 3. The post-processing control unit 15 includes a control circuit including a processor 151, a memory 152, and a storage unit 153. The post-processing control unit 15 controls, for example, the standby unit 12, the processing unit 13, and the discharge unit 14. The post-processing control unit 15 conveys the sheet to the standby tray 17 by controlling motors that respectively drive rollers 20*a* and 20*b* and rollers 21*a* and 21*b*. The post-processing control unit 15 acquires an output of the sensor 16 and controls the operation of the post-processing apparatus 3 in response to the output of the sensor 16.

The sensor 16 includes a light emitting unit 16-1 and a light receiving unit 16-2. The light emitting unit 16-1 (e.g., a light emitter) includes a light emitting element such as a light emitting diode (LED). The light receiving unit 16-2 (e.g., a light receiver) includes a light receiving element. The light emitting unit 16-1 and the light receiving unit 16-2 are installed so that light emitted from the light emitting unit 16-1 enters the light receiving unit 16-2. The light emitting unit 16-1 and the light receiving unit 16-2 are provided at positions where detection of the foreign substance (e.g., a foreign object) by the sensor 16 is desired. In some embodiments, the foreign substance or object may include multiple foreign substances and/or objects. The light receiving unit 16-2 outputs a voltage value generated based on the light reception to the post-processing control unit 15. In the embodiment, the light receiving unit 16-2 outputs a higher voltage value as the amount of incident light increases, and outputs a lower voltage value as the amount of incident light decreases. That is, as the voltage value in the light receiving unit 16-2 is lower, a possibility (e.g., a likelihood, a probability) that the foreign substance is present is higher. The voltage value is merely one specific example of the output value of the sensor 16. The sensor 16 may output another type of value (for example, a current value or another physical quantity) instead of the voltage value. A detection range of the sensor 16 is a space where an electromagnetic wave emitted by the light emitting unit 16-1 is propagated. That is, the detection range is a space where an object can be detected by the light emitting unit 16-1 and the light receiving unit 16-2 operating in association with each other.

Figure 2:
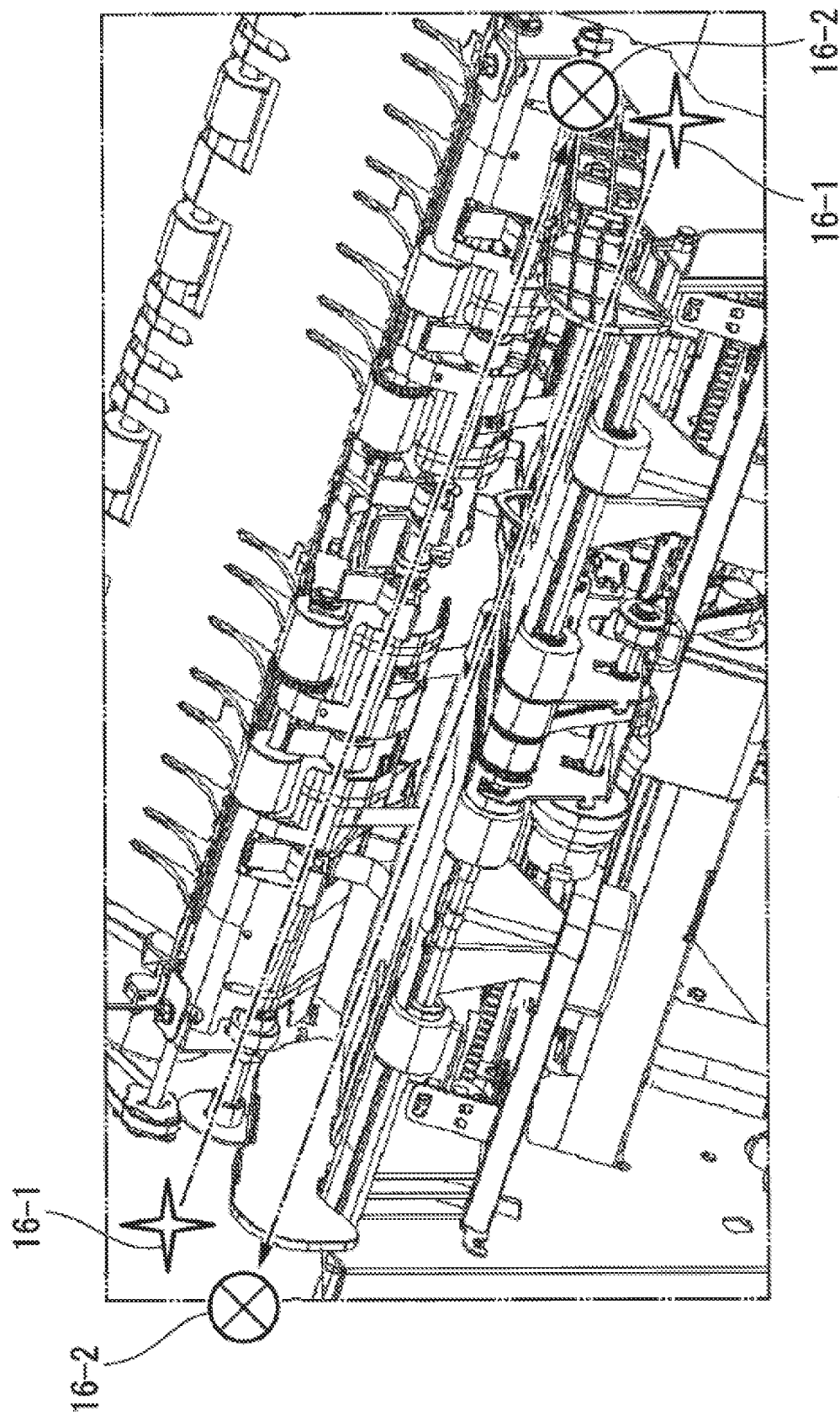
FIG. 2 is a diagram illustrating positions of a light emitting unit and a light receiving unit in the embodiment.

FIG. 2 is a diagram illustrating the positions of the light emitting unit 16-1 and the light receiving unit 16-2 in the embodiment. The light emitting unit 16-1 is installed at one end of the processing tray 18 in a sheet width direction. The light receiving unit 16-2 is installed at the other end in the sheet width direction of the processing tray 18. The post-processing apparatus 3 may include one sensor 16 or a plurality of sensors 16. In an example of FIG. 2, two sensors 16 are provided.

Next, the processing of the post-processing control unit 15 will be described in detail. The storage unit 153 stores at least one reference value (e.g., at least one threshold value) of the output of the sensor 16. The at least one reference value includes a minimum reference value (e.g., a minimum threshold value) and a maximum reference value (e.g., a maximum threshold value).

The minimum reference value is a minimum value of a voltage that can be outputted when the sensor 16 operates normally in a state where the foreign substance does not exist in the detection range of the sensor 16. For example, in a state where the foreign substance is not present and the sheet is not placed on the processing tray 18, the voltage value outputted by the light receiving unit 16-2 when the light emitting unit 16-1 emits the light at the minimum value of an operating power supply voltage of the sensor 16 may be defined as the minimum reference value. The intensity (e.g., magnitude, an amount) of the light emitted by the light emitting unit 16-1 may vary based on the operating power supply voltage of the sensor 16. Accordingly, the minimum value of the operating supply voltage to the sensor may correspond to the minimum light received by the light receiving unit 16-2. The reason why the minimum reference value is defined in the state where the sheet is not placed on the processing tray 18 is to prevent light reflected on a sheet surface from being incident on the light receiving unit 16-2. When the sheet is placed on the processing tray 18, the light emitted from the light emitting unit 16-1 may be reflected on the sheet surface and incident on the light receiving unit 16-2. Such reflected light may be incident on the light receiving unit 16-2 even though the foreign substance exists in the detection range. Therefore, the minimum reference value is defined in a state where such reflected light is least likely to occur, that is, in a state where the sheet is not present (i.e., absent) on the processing tray 18, whereby it is possible to more accurately define the minimum reference value. Such a definition of the minimum reference value may be performed at the time of manufacturing the post-processing apparatus 3 or before the shipment thereof (e.g., to an end user), or may be performed in a state immediately after the post-processing apparatus 3 is installed. The minimum reference value obtained by the above-described definition is recorded in the storage unit 153. In the following description, the minimum reference value may be indicated as "A1".

The maximum reference value is a maximum value of a voltage that can be outputted when the sensor 16 operates normally in a state where it is determined that the foreign substance does not exist in the detection range of the sensor 16. For example, in a state where the foreign substance is not present (i.e., is absent) and the sheet is placed on the processing tray 18 up to a maximum stacking amount, the voltage value outputted by the light receiving unit 16-2 when the light emitting unit 16-1 emits the light at the maximum value of the operating power supply voltage of the sensor 16 may be defined as the maximum reference value. The intensity (e.g., magnitude) of the light emitted by the light emitting unit 16-1 may vary based on the operating power supply voltage of the sensor 16. Accordingly, the maximum value of the operating supply voltage to the sensor may correspond to the maximum light received by the light receiving unit 16-2. The reason why the maximum reference value is defined in the state where the sheet is placed on the processing tray 18 up to the maximum stacking amount is to generate a state where the light reflected on the sheet surface is the most incident on the light receiving unit 16-2. When the sheet is placed on the processing tray 18 up to the maximum stacking amount, an upper part of the sheet bundle placed on the processing tray 18 takes the highest position. In this case, since the upper part of the sheet is closest to the light emitting unit 16-1, the reflected light at the upper part of the sheet becomes the strongest. Such reflected light may be incident on the light receiving unit 16-2 even though the foreign substance exists in the detection range. Therefore, the maximum reference value is defined in a state where such reflected light is most likely to occur, that is, in a state where the sheet is placed on the processing tray 18 up to the maximum stacking amount, whereby it is possible to more accurately define the maximum reference value. Such a definition of the maximum reference value may be performed at the time of manufacturing the post-processing apparatus 3 or before the shipment thereof, or may be performed in the state immediately after the post-processing apparatus 3 is installed (before use by an end user). The maximum reference value obtained by the above-described definition is recorded in the storage unit 153. In the following description, the maximum reference value may be indicated as "A2".

Figure 3:
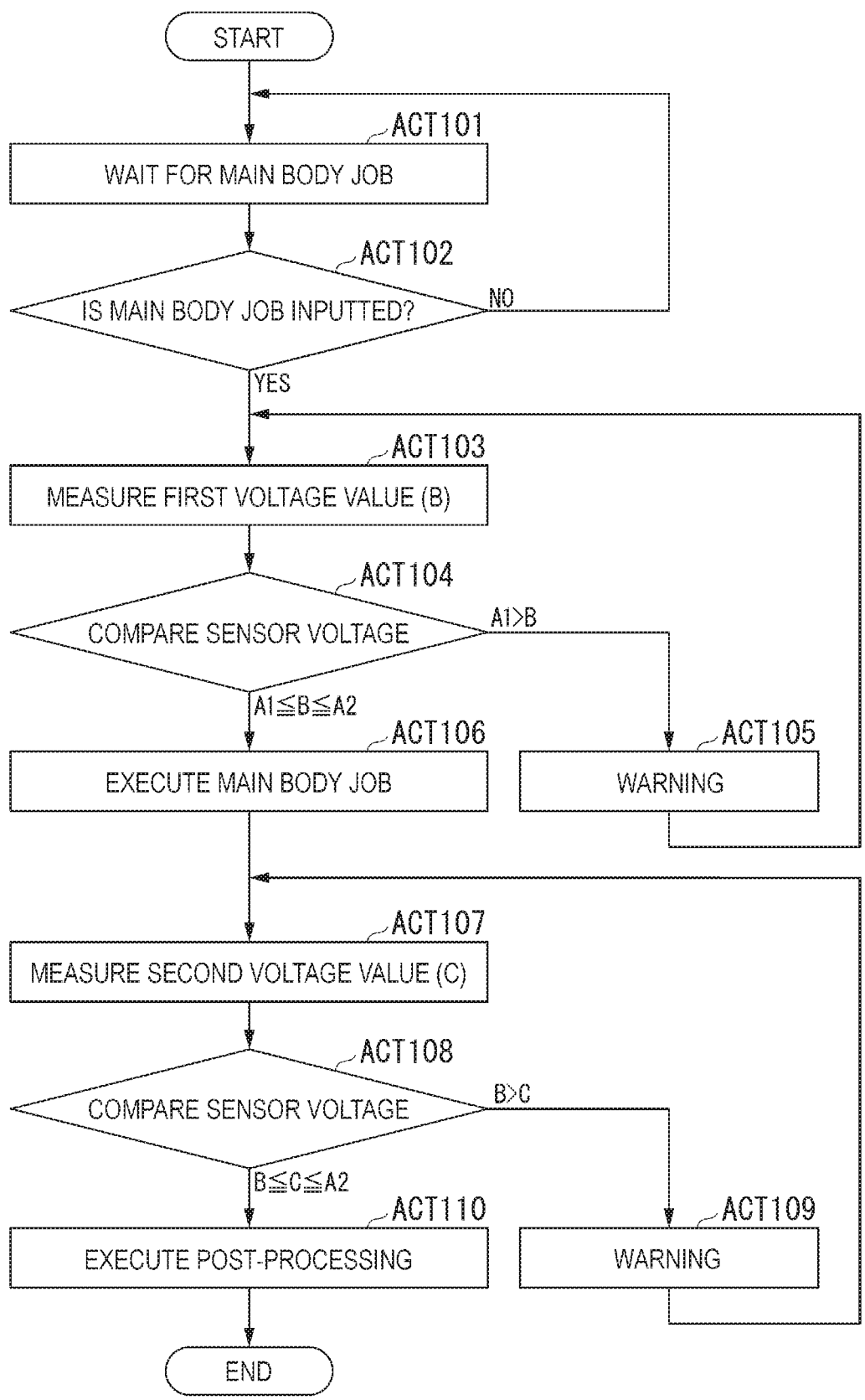
FIG. 3 is a flow chart illustrating a specific example of detection processing of a post-processing control unit.

The post-processing control unit 15 detects the presence of the foreign substance based upon the minimum reference value, the maximum reference value, and the voltage value of the sensor 16 acquired each time. FIG. 3 is a diagram illustrating a specific example of detection processing of the post-processing control unit 15. Hereinafter, a specific example of the processing of the post-processing control unit 15 will be described with reference to FIG. 3.

First, the post-processing control unit 15 waits until a job with respect to a main body of the image forming apparatus 2 (hereinafter, referred to as a "main body job") is inputted to the image forming apparatus 2 (ACT 101 and ACT 102—NO). When the main body job is inputted thereinto (ACT 102—YES), the image forming apparatus 2 notifies the post-processing control unit 15 that the main body job is inputted. In response to the notification, the post-processing control unit 15 acquires an output of the sensor 16 at that time and records the acquired output in the memory 152 as a first voltage value (ACT 103). In the following description, the first voltage value may be indicated as "B".

The post-processing control unit 15 compares the first voltage value with the reference values (ACT 104). When the first voltage value is lower than the minimum reference value (ACT 104: A1>B), the post-processing control unit 15 outputs a warning to the image forming apparatus 2 (ACT 105). In some embodiments, when the first voltage value is greater than the maximum reference value (ACT 104: B>A2), the post-processing control unit 15 outputs a warning to the image forming apparatus 2 (ACT 105). When receiving the warning from the post-processing control unit 15, the image forming apparatus 2 outputs the warning without executing the main body job (e.g., the image forming apparatus 2 stops or prevents execution of the main body job). The output of the warning may be performed by outputting a sound, or may be performed by displaying an image. For example, the image forming apparatus 2 displays a character or an image indicating the warning on the control panel 5.

On the other hand, when the first voltage value is equal to or greater than the minimum reference value (ACT 104: A1≤B), the post-processing control unit 15 outputs normality to the image forming apparatus 2. When receiving the notification of the normality from the post-processing control unit 15, the image forming apparatus 2 executes the main body job (ACT 106). The post-processing control unit 15 may be configured not to notify anything instead of providing an explicit notification of the normality. In this case, when not receiving notification of abnormality from the post-processing control unit 15 even though a predetermined time passes after the notification of the input of the main body job, the image forming apparatus 2 may be configured to execute the main body job.

When the execution of the main body job is completed in the image forming apparatus 2, the image forming apparatus 2 notifies the post-processing control unit 15 that the main body job is completed. In response to the notification, the post-processing control unit 15 acquires an output of the sensor 16 at that time and records the acquired output in the memory 152 as a second voltage value (ACT 107). In the following description, the second voltage value may be indicated as "C".

The post-processing control unit 15 compares the second voltage value with the first voltage value (ACT 108). When the second voltage value is lower than the first voltage value (ACT 108: B>C), the post-processing control unit 15 outputs a warning to the image forming apparatus 2 without executing the post-processing instructed from the image forming apparatus 2 (ACT 109). In some embodiments, when the second voltage value is greater than the maximum reference value (ACT 108: C>A2), the post-processing control unit 15 outputs a warning to the image forming apparatus 2 without executing the post-processing instructed from the image forming apparatus 2 (ACT 109). When receiving the warning from the post-processing control unit 15, the image forming apparatus 2 outputs the warning. The output of the warning may be performed by outputting a sound, or may be performed by displaying an image. For example, the image forming apparatus 2 displays a character or an image indicating the warning on the control panel 5. On the other hand, when the second voltage value is equal to or greater than the first voltage value (ACT 108: B C), the post-processing control unit 15 executes the post-processing (ACT 110).

Figure 4:
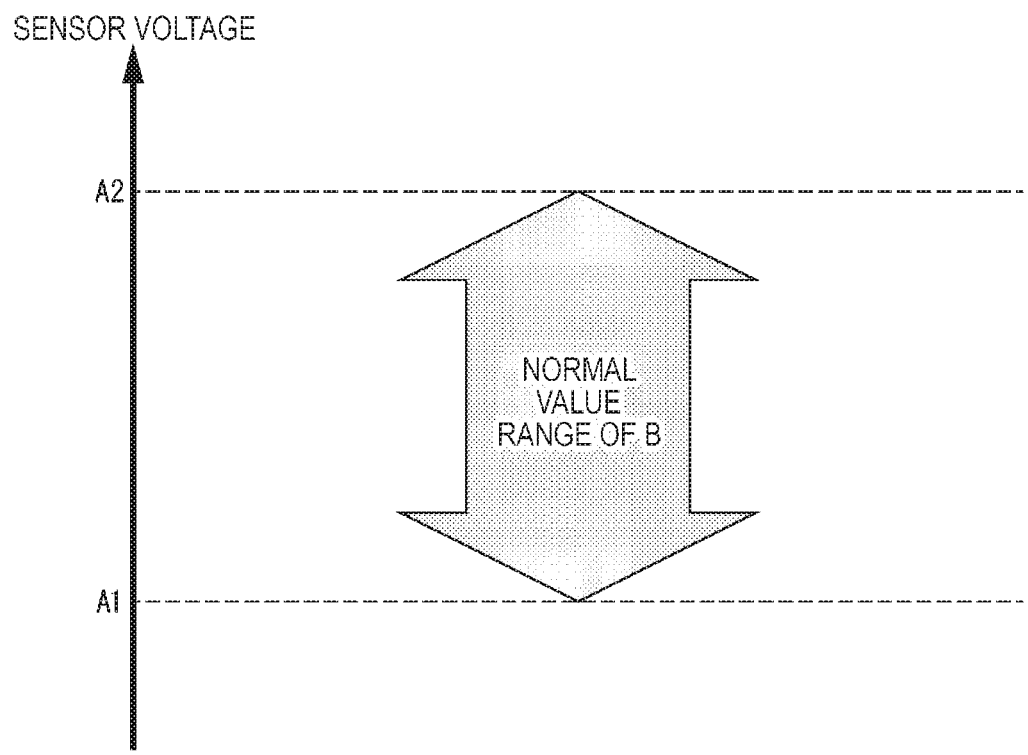
FIG. 4 is a diagram illustrating an outline of processing of the post-processing control unit.
Figure 5:
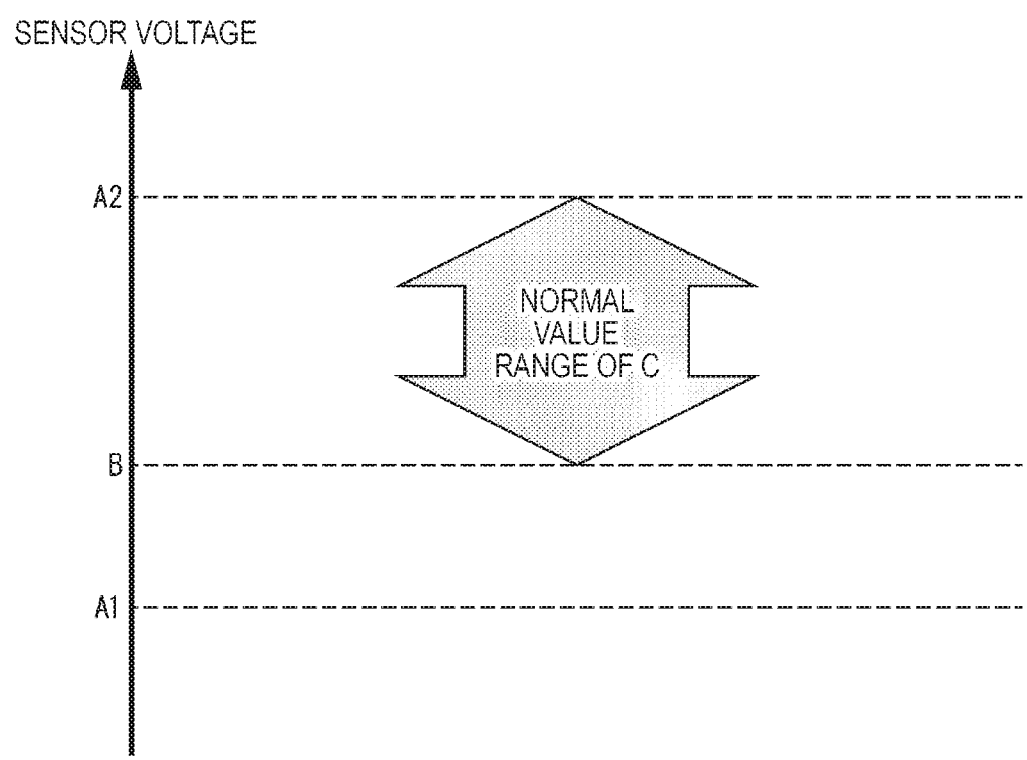
FIG. 5 is a diagram illustrating an outline of the processing of the post-processing control unit.

FIGS. 4 and 5 are diagrams illustrating an outline of the processing of the post-processing control unit 15. FIG. 4 is a diagram illustrating a relationship between the first voltage value and the reference value. The first voltage value "B" is a normal value when the first voltage value "B" is a value between the minimum reference value "A1" and the maximum reference value "A2". When the first voltage value "B" is lower than the minimum reference value "A1", a value further lower than the minimum value that can be acquired when the foreign substance does not exist is outputted. Therefore, there is a high possibility that the light which should be incident on the light receiving unit 16-2 is blocked by the foreign substance. In such a case, the post-processing control unit 15 detects the abnormality.

FIG. 5 is a diagram illustrating a relationship between the second voltage value and the first voltage value. The second voltage value "C" is a normal value when the second voltage value "C" is not the minimum reference value "A1" but is a value greater than the first voltage value "B". When the second voltage value "C" is lower than the first voltage value "B", the light incident on the light receiving unit 16-2 is relatively smaller than that of a state before the execution of the main body job. Therefore, there is a high possibility that the light which should be incident on the light receiving unit 16-2 is blocked by the foreign substance intruding while the main body job is executed or after the main body job is executed. In such a case, the post-processing control unit 15 detects the abnormality.

According to the processing of the post-processing control unit 15 configured as described above, a reference value assuming the reflected light of the sheet that may be placed on the processing tray 18 is defined in advance, and the foreign substance is detected based upon the reference value. Therefore, even though the reflected light is generated, it is possible to more accurately detect the foreign substance.

According to the processing of the post-processing control unit 15 configured as described above, at the time when the main body job is performed and the time when the subsequent post-processing is performed, the foreign substance is detected based upon different criteria. More specifically, the foreign substance when the post-processing is performed is detected based upon the voltage value (i.e., the first voltage value) obtained when the main body job is performed. Therefore, even though there is the foreign substance intruding while the main body job is executed or after the main body job is executed, it is possible to more accurately detect the presence of the foreign substance.

The post-processing control unit 15 may determine whether or not the second voltage value is between the minimum reference value and the maximum reference value. The post-processing control unit 15 may determine the abnormality when the second voltage value is greater than the maximum reference value.

All or a part of each function of the image forming apparatus 2 and the post-processing apparatus 3 may be implemented by using hardware such as an application specific integrated circuit (ASIC), a programmable logic device (PLD), and a field programmable gate array (FPGA). The program may be recorded on a computer readable recording medium. The computer readable recording medium is, for example, a portable medium such as a flexible disk, a magneto-optical disk, a ROM, and a CD-ROM, and a storage apparatus such as a hard disk built in a computer system. The program may be transmitted via an electric communication line.

While certain embodiments have been described, these embodiments have been presented by way of example only, and are not intended to limit the scope of the inventions. Indeed, the novel embodiments described herein may be embodied in a variety of other forms. Furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A post-processing apparatus connected to an image forming apparatus configured to form an image on a sheet, the post-processing apparatus comprising:
    a post-processor configured to perform post-processing on the sheet;
    a sensor provided in a space where the post-processor operates, the sensor being configured to provide an output based on a presence of a foreign substance in the space; and
    a control circuit configured to:
        acquire a first output value from the sensor prior to the image forming apparatus forming the image on the sheet, the first output value corresponding to a first probability that the foreign substance is present in the space where the post-processor operates;
        acquire a second output value from the sensor after the image forming apparatus forms the image on the sheet and before the post-processor performs the post-processing on the sheet, the second output value corresponding to a second probability that the foreign substance is present in the space where the post-processor operates;
        determine whether or not the foreign substance is present in the space where the post-processor operates based on the first output value and the second output value; and
        prevent the post-processor from performing the post-processing on the sheet in response to a determination that the second probability is higher than the first probability.

2. The post-processing apparatus of claim 1, wherein the post-processing includes at least one of (a) stapling the sheet or (b) punching a hole in the sheet.

3. A post-processing apparatus connected to an image forming apparatus configured to form an image on a sheet, the post-processing apparatus comprising:
    a post-processor configured to perform post-processing on the sheet;
    a sensor provided in a space where the post-processor operates, the sensor being configured to provide an output based on a presence of a foreign substance in the space; and
    a control circuit configured to:
        store at least one reference value provided by the sensor when the post-processing apparatus is in a state where the foreign substance is absent from a detection range of the sensor;
        acquire a first output value from the sensor after storing the at least one reference value and prior to the image forming apparatus forming the image on the sheet;
        determine whether or not the foreign substance is present in the space at a time when the first output value is acquired, based on the first output value and the at least one reference value;
        acquire a second output value from the sensor after the image forming apparatus forms the image on the sheet and before the post-processor performs the post-processing on the sheet; and
        determine whether or not the foreign substance is present in the space where the post-processor operates based on the first output value and the second output value.

4. The post-processing apparatus of claim 3, wherein:
    the at least one reference value includes both (a) a minimum reference value which is a minimum value that the sensor is capable of outputting in the state where the foreign substance is absent from the detection range of the sensor, and (b) a maximum reference value which is a maximum value the sensor is capable of outputting in the state where the foreign substance is absent from the detection range of the sensor; and
    the control circuit is configured to determine that the foreign substance is absent from the space at the time when the first output value is acquired, when the first output value is between the minimum reference value and the maximum reference value.

5. The post-processing apparatus of claim 4, wherein the control circuit is configured to determine that the foreign substance is present in the space at the time when the first output value is acquired in response to the first output value being lower than the minimum reference value.

6. The post-processing apparatus of claim 4, wherein the minimum reference value is measured in a state where both (a) the sheet is not placed on the post-processor and (b) the sensor operates at a minimum operating power supply voltage.

7. The post-processing apparatus of claim 4, wherein the maximum reference value is measured in a state where both (a) a maximum stacking amount of sheets are placed on the post-processor and (b) the sensor operates at a maximum operating power supply voltage.

8. The post-processing apparatus of claim 3, wherein the at least one reference value is measured prior to use of the post-processing apparatus by an end user.

9. The post-processing apparatus of claim 3, wherein the control circuit is configured to notify the image forming apparatus of an abnormality in response to a determination that the foreign substance is present in the space at the time when the first output value is acquired.

10. A post-processing apparatus connected to an image forming apparatus configured to form an image on a sheet, the post-processing apparatus comprising:
 a post-processor configured to perform post-processing on the sheet;
 a sensor provided in a space where the post-processor operates, the sensor being configured to provide an output based on a presence of a foreign substance in the space; and
 a control circuit configured to:
  store a threshold value provided by the sensor when the post-processing apparatus is in a state where the foreign substance is absent from a detection range of the sensor;
  acquire a first output value from the sensor after storing the threshold value and prior to the image forming apparatus forming the image on the sheet;
  acquire a second output value from the sensor after the image forming apparatus forms the image on the sheet and before the post-processor performs the post-processing on the sheet; and
  determine whether or not the foreign substance is present in the space where the post-processor operates based on the first output value, the second output value, and the threshold value.

11. The post-processing apparatus of claim 10, wherein the threshold value is a minimum threshold value, and the control circuit is configured to prevent the image forming apparatus from forming the image on the sheet in response to a determination that the first output value is less than the minimum threshold value.

12. The post-processing apparatus of claim 10, wherein the threshold value is a maximum threshold value, and the control circuit is configured to prevent the image forming apparatus from forming the image on the sheet in response to a determination that the first output value is greater than the maximum threshold value.

13. The post-processing apparatus of claim 10, wherein the threshold value is a maximum threshold value, and the control circuit is configured to prevent the post-processor from performing the post-processing on the sheet in response to a determination that the second output value is greater than the maximum threshold value.

14. The post-processing apparatus of claim 13, wherein the control circuit is configured to:
 prevent the image forming apparatus from forming the image on the sheet in response to a determination that the first output value is less than a minimum threshold value; and
 prevent the image forming apparatus from forming the image on the sheet in response to a determination that the first output value is greater than the maximum threshold value.

15. The post-processing apparatus of claim 1, wherein the sensor includes (a) a light emitter configured to emit light into the space where the post-processor operates and (b) a light receiver configured to provide the output, the output varying based on an amount of light received by the light receiver.

16. The post-processing apparatus of claim 15, wherein an intensity of the light emitted by the light emitter varies based on an operating power supply voltage supplied to the light emitter.

17. A control method performed by a post-processing apparatus connected to an image forming apparatus that forms an image on a sheet, the post-processing apparatus including a post-processor configured to perform post-processing on the sheet, and a sensor that is provided in a space where the post-processor operates and that is configured to detect a presence of a foreign substance, the control method comprising:
 acquiring a first output value from the sensor before the image forming apparatus forms the image on the sheet;
 acquiring a second output value from the sensor after the image forming apparatus forms the image on the sheet and before the post-processor performs the post-processing on the sheet;
 determining, before the post-processor performs the post-processing, whether a second probability corresponding to the second output value is higher than a first probability corresponding to the first output value, the first probability and the second probability being probabilities that the foreign substance is present in the space where the post-processor operates; and
 preventing the post-processor from performing the post-processing on the sheet in response to a determination that the second probability is higher than the first probability.

* * * * *